United States Patent
Laufer et al.

(10) Patent No.: US 10,494,505 B2
(45) Date of Patent: Dec. 3, 2019

(54) METHOD FOR STABILIZING POLYESTER-RESIN-BASED BIOPLASTICS

(71) Applicant: RHEIN CHEMIE RHEINAU GMBH, Mannheim (DE)

(72) Inventors: Wilhelm Laufer, Ellerstadt (DE); Martina Schoenhaber, Darmstadt (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 15/325,141

(22) PCT Filed: Jul. 13, 2015

(86) PCT No.: PCT/EP2015/065967
§ 371 (c)(1),
(2) Date: Jan. 10, 2017

(87) PCT Pub. No.: WO2016/008843
PCT Pub. Date: Jan. 21, 2016

(65) Prior Publication Data
US 2017/0190873 A1    Jul. 6, 2017

(30) Foreign Application Priority Data
Jul. 14, 2014   (EP) .................................... 14176949

(51) Int. Cl.
*C08K 5/29* (2006.01)
(52) U.S. Cl.
CPC .................................... *C08K 5/29* (2013.01)
(58) Field of Classification Search
CPC ........... C08K 5/29; C08L 67/04; C08L 75/06; C08G 18/797
See application file for complete search history.

(56) References Cited

U.S. PATENT DOCUMENTS

| | | | |
|---|---|---|---|
| 2,840,589 A * | 6/1958 | Smeltz | C07C 265/12 560/334 |
| 3,502,722 A | 3/1970 | Neumann | |
| 6,107,378 A | 8/2000 | Imashiro et al. | |
| 6,846,860 B2 | 1/2005 | Takahashi et al. | |
| 7,273,902 B2 | 9/2007 | Takahashi et al. | |
| 8,197,929 B2 | 6/2012 | Watanabe et al. | |
| 2002/0164486 A1* | 11/2002 | Guse | C08G 18/12 428/423.1 |
| 2005/0032947 A1* | 2/2005 | Takahashi | C08L 67/00 524/195 |
| 2005/0160940 A1* | 7/2005 | Hippold et al. | C09D 4/00 106/270 |
| 2009/0270530 A1 | 10/2009 | Nakai et al. | |
| 2012/0071595 A1* | 3/2012 | Laufer | C08K 5/29 524/98 |
| 2012/0123052 A1* | 5/2012 | Laufer | C08G 18/0828 524/589 |
| 2012/0165447 A1 | 6/2012 | Fruth et al. | |

FOREIGN PATENT DOCUMENTS

| | | | | |
|---|---|---|---|---|
| DE | 1130594 B | | 7/1957 | |
| DE | 10146328 A1 | | 4/2003 | |
| JP | 2005-232225 | * | 9/2005 | ............. C08L 67/07 |

OTHER PUBLICATIONS

Machine translation of JP 2005-232225. (Year: 2005).*
Neumann, W. et al., "The Preparation of Carbodiimides from Isocyanates", Angew, Chem. Internat. Edit., vol. 1 (1962), No. 12, pp. 621-625.
International Search Report from International Application No. PCT/EP2015/065967, dated Sep. 11, 2015, three pages.

* cited by examiner

*Primary Examiner* — John E Uselding

(57) ABSTRACT

The object of the invention is a method for stabilizing polyester-resin-based bioplastics by means of specific carbodiimides.

11 Claims, No Drawings

METHOD FOR STABILIZING POLYESTER-RESIN-BASED BIOPLASTICS

The present invention relates to a process for the stabilization of biobased plastic based on polyester resin by means of certain carbodiimides.

Plastics based on polyester resins are polymers produced by means of condensation polymerization, comprising ester bonds.

Biobased plastics, know as biopolymers, are materials that, by virtue of the biobased feedstocks used, are more environmentally sustainable than petrochemically based plastics. In particular in respect of protection of the environment and the threat of global warming, biobased plastics are assuming increasing importance not only in the packaging sector but also in the production of durable, and also technical, plastics products. However, if biobased materials are to be capable of competing with conventional and well-established materials, there is a need for further optimization of many aspects of the production and processing of the materials.

Biobased plastics made of aliphatic polyester resin are produced by polymerization of monomers obtained by fermentation from starch, from sugar, from carbohydrates, from fats, or from vegetable oil. Other biobased plastics are aliphatic-aromatic polyesters which are based on a biogenically produced diol component, or biopolyamides where the acid component is obtained from naturally occurring substances.

Biobased plastics have the great advantage of being environmentally friendly. However, they are disadvantageously very susceptible to hydrolysis, not only during processing but also in use in the final products. Hydrolysis is discernible via the typical signs, for example molar mass reduction and viscosity decrease, and is unavoidable unless a stabilizer system is used. It leads to poorer processability, and to shorter lifetime of the final product.

Attempts have been made to solve this problem by adding a very wide variety of additives: by way of example, EP-A 0 890 604 and EP-A 1 277 792 use carbodiimide compounds to stabilize biodegradable plastics compositions. The carbodiimides described in those documents are aliphatic and aromatic monomeric and oligomeric carbodiimides, but they lead only to a small increase of lifetime.

Although the antioxidants additionally used in EP-A 1354917 reduce yellowing, they do not increase stability. The same applies to EP-A 1 876 205, where a biopolymer composition made of a biodegradable polyester is used with a carbodiimide, a phosphite compound, and a silicate compound.

EP-A 1627894 discloses the production of a film made of aliphatic polyester resins, preferably polylactic acid, where a wide variety of carbodiimides is mentioned for stabilization. However, the long-term stability criterion is satisfied only to a limited extent here.

It was therefore an object to provide a process which does not have the disadvantages of the prior art for the stabilization of biobased plastics based on polyester resin, and which provides more efficient stability in respect of hydrolysis.

Surprisingly, it has now been found that the carbodiimides used in the process of the Invention meet this requirement.

The present invention therefore provides a process for the stabilization of biobased plastic based on polyester resin, wherein carbodiimides of the formula (I)

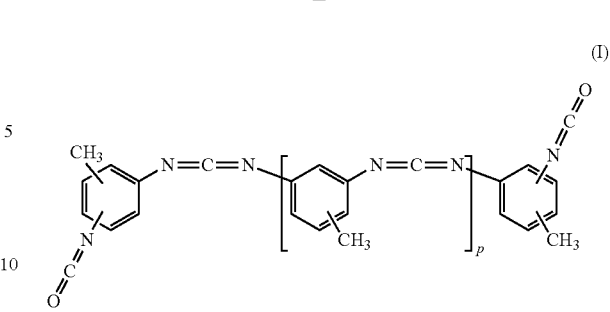

where p=from 0 to 50, preferably p=from 0 to 10, are incorporated into the plastic.

In a particularly preferred embodiment of the present invention, the carbodiimide is a compound of the formula (II)

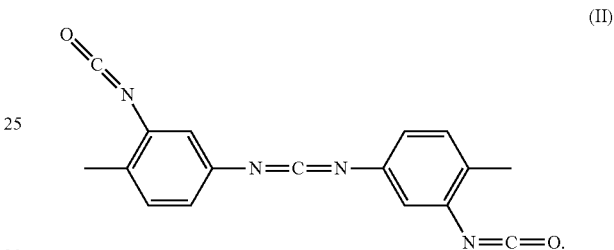

The carbodiimides of the formulae (I) and (II) are commercially available compounds obtainable from Rhein Chemie Rheinau GmbH, for example with trademark Addolink® ST.

It is equally possible to produce the carbodiimides by the processes described by way of example in Angewandte Chemie 74 (21), 1962, pp. 801-806, or via condensation of diisocyanates with elimination of carbon dioxide at elevated temperatures, preferably at from 40° C. to 200° C., in the presence of catalysts. Suitable processes are described in DE-B-1156401 and in DE-B-11 305 94. Compounds that have proven successful as catalysts are preferably strong bases or phosphorus compounds. It is preferably to use phospholene oxides, phospholidines, or phospholine oxides, or the corresponding sulfides. Other compounds that can be used as catalysts are tertiary amines, basic metal compounds, metal carboxylates, and non-basic organometallic compounds.

The biobased plastics for the purposes of the invention are preferably aliphatic polyester resins produced by polymerization of monomers obtained by fermentation or of polymers obtained by fermentation from starch, from sugar, from carbohydrates, from fats, or from vegetable oil, or are aliphatic-aromatic polyester resins based on a biogenically produced diol component, or are biopolyamides where the acid component is obtained from naturally occurring substances.

In a preferred embodiment of the present invention, the biobased polyester resin is polylactic acid (PL), polyhydroxyalkanoate (PHA), polybutylene adipate terephthalate (PBAT), polybutylene succinate (PBS), and/or polybutylene succinate terephthalate (PBST), preferably polylactic acid (PLA).

Blends made of biobased plastics are concomitantly included here, preference being given to polylactic acid (PL), polyhydroxyalkanoate (PHA), polybutylene adipate terephthalate (PBAT), polybutylene succinate (PBS), and/or polybutylene succinate terephthalate (PBST), with polycarbonate, polybutylene terephthalate (PBT), polymethyl methacrylate (PMMA), acrylonitrile-butadiene-styrene (ABS) and/or polyamide.

For the purposes of the invention, the expression "based on" preferably means a proportion of at least 40% by weight, particularly preferably 45-100% by weight, very particularly preferably from 50 to 100% by weight, in relation to the plastic.

The abovementioned biobased polyester resins are commercially available.

The polylactic acid particularly preferred as aliphatic polyester resin is likewise commercially available, e.g. from NatureWorks LLC, or can be produced by the processes familiar to the person skilled in the art, for example via ring-opening polymerization of lactides. The use of polylactic acid produced via ring-opening polymerization of lactides is not restricted here to either of the two enantiomers, L-lactic acid or D-lactic acid, or mixtures thereof. For the purposes of the invention, it is possible here to use the polymers of L-lactic acid and/or D-lactic acid as aliphatic polyester resin. Other forms of polylactic acid are also concomitantly included, as also are copolymers comprising polylactic acid.

The polyhydroxyalkanoates particularly preferred as aliphatic polyester resin are commercially available, e.g. from Metabolix Inc., or can be produced by the processes familiar to the person skilled in the art, e.g. via microbial fermentation from sugar or fats.

It is preferably when 0.3-2.5% by weight, particularly preferably 0.5-2.0% by weight, very particularly preferably from 1 to 1.5% by weight, of a carbodiimide of the formula (I) and/or (II) is/are incorporated in the process of the invention.

The carbodiimides can be incorporated here into the plastic by way of any of the familiar assemblies for agitation and mixing. Preference is given here to extruders or kneaders, particular preference to extruders. These are commercially available assemblies.

In a preferred embodiment of the present invention, the incorporation is achieved at temperatures of from 150 to 280° C.

In another embodiment of the process of the invention, further additives are used, preferably nucleating agents, reinforcement fibers, impact modifiers, flow improvers, and/or UV stabilizers.

The proportion of these can be from 0.05 to 40% by weight, in relation to the plastic.

The invention therefore comprises the use of carbodiimides of the formula (I)

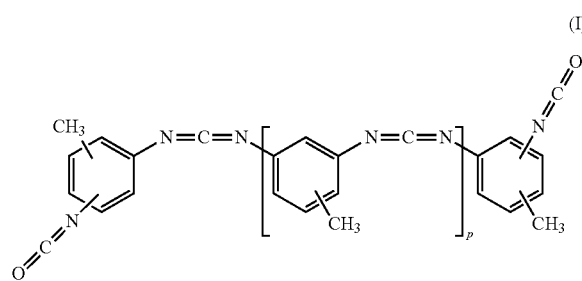

where p=0 to 50, preferably p=0 to 10, and/or of the formula (II)

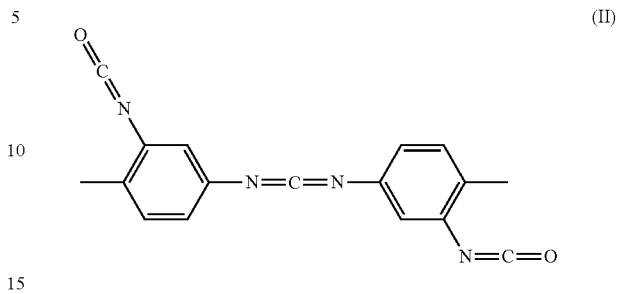

to protect biobased plastics from hydrolysis.

The proportion of the compounds of the formula (I) and/or (II) here is preferably 0.3-2.5% by weight, particularly preferably 0.5-2.0% by weight, very particularly preferably from 1 to 1.5% by weight.

The scope of the invention includes all combinations of all of the moieties definitions, indices, parameters, and explanations set out above and hereinafter, where these are mentioned in general terms or in preferred ranges, i.e. also includes any desired combination of the respective ranges and preferred ranges.

The examples below serve to explain the invention, without any resultant limiting effect.

EXAMPLES

Chemicals Used:
CDI I: a carbodimide of formula (II) for the inventive example
CDI II: bis-2,6-diIsopropylphenylcarbodIimide for the comparative example
CDI III: polymeric carbodiimide based on triisopropylphenyl diisocyanate for the comparative example
Commercially available polylactic acid (PLA) 3251 D from NatureWorks LLC
Method:
The respective carbodiimides were incorporated into the polylactic acid by means of a 10 ZSK 25 laboratory twin-screw extruder from Werner & Pfleiderer at a temperature of 190° C.

The quantities used of carbodimide and the nature of the carbodimide used can be seen in table 1.

The standard F3 test samples were produced in an Arburg Allrounder 320 S 150-500 injection molding machine.

For the polylactic acid (PLA) hydrolysis test, the standard F3 test samples were stored at a temperature of 65° C. in water, and tensile strength was checked after various time intervals. Hydrolysis resistance was tested by determining the number of days that have expired before the tensile strength value is less than 5 MPa. Comparative example 1 is polylactic acid (PLA) without carbodiimide.

TABLE 1

| | Hydrolysis resistance | | |
|---|---|---|---|
| Example | CDI | Concentration of CDI | Duration of protection from hydrolysis [days] |
| 1 (C) | — | — | 4 |
| 2 (I) | CDI I | 1% | 10 |
| 3 (I) | CDI I | 1.5% | 16 |

TABLE 1-continued

| | Hydrolysis resistance | | |
|---|---|---|---|
| Example | CDI | Concentration of CDI | Duration of protection from hydrolysis [days] |
| 4 (C) | CDI II | 1% | 7 |
| 5 (C) | CDI II | 1.5% | 11 |
| 6 (C) | CDI III | 1% | 8 |
| 7 (C) | CDI III | 1.5% | 11 |

It can be seen from the table that, even at low carbodiimide concentration, the process of the invention can achieve the hydrolysis resistance that the carbodiimides known in the prior art achieve only at markedly higher concentrations.

What is claimed is:

1. A process for the stabilization of biobased plastic based on polyester resin, the process comprising incorporating 0.3-2.5% by weight of a carbodiimide composition into biobased plastic based on polyester resin, wherein the carbodiimide composition consists of carbodiimides of the formula (II)

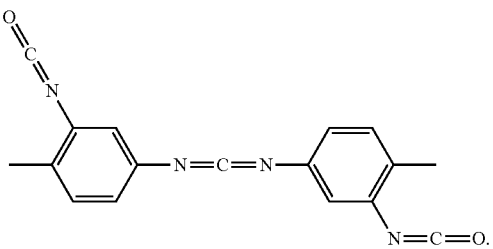

(II)

2. The process as claimed in claim 1, wherein the biobased plastic based on polyester resin is at least one of:
   an aliphatic polyester resin produced by polymerization of monomers obtained by fermentation,
   an aliphatic polyester resin of polymers obtained by fermentation from starch, from sugar, from carbohydrates, from fats, or from vegetable oil,
   an aliphatic-aromatic polyester resin based on a biogenically produced diol component, and
   a biopolyamide in which the acid component is obtained from naturally occurring substances.

3. The process as claimed in claim 2, wherein the biobased polyester resin is polylactic acid (PLA), polyhydroxyalkanoate (PHA), polybutylene adipate terephthalate (PBAT), polybutylene succinate (PBS), and/or polybutylene succinate terephthalate (PBST).

4. The process as claimed in claim 1, wherein the incorporation is achieved by means of an extruder.

5. The process as claimed in claim 1, wherein the incorporation is done at a temperature of 150 to 280° C.

6. The process as claimed in claim 1, wherein the biobased plastic based on polyester resin further comprises nucleating agents, reinforcement fibers, impact modifiers, flow improvers, and/or UV stabilizers.

7. A method for increasing hydrolysis resistance of polylactic acid, the method comprising introducing 1 to 1.5% by weight of a carbodiimide composition into polylactic acid, wherein the carbodiimide composition consists of carbodiimides of the formula (II)

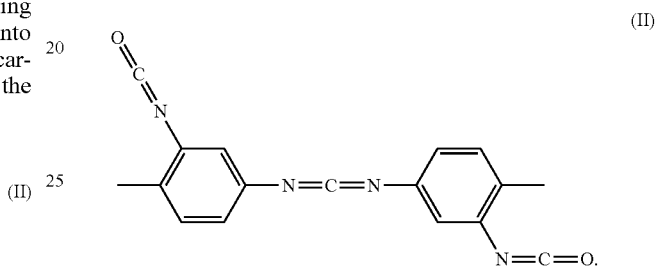

(II)

8. The process as claimed in claim 7, wherein:
   the incorporating is done at 150 to 280° C., and
   the incorporating comprises mixing the carbodiimide composition into the polylactic acid by means of an extruder.

9. The process as claimed in claim 1, wherein the amount of carbodiimide composition incorporated into the plastic is 1 to 1.5% by weight, based on the total weight of the biobased plastic.

10. The process as claimed in claim 9, wherein the biobased plastic based on polyester resin is polylactic acid (PLA), polyhydroxyalkanoate (PHA), polybutylene adipate terephthalate (PBAT), polybutylene succinate (PBS), and/or polybutylene succinate terephthalate (PBST).

11. The process as claimed in claim 10, wherein the incorporating is done at 150 to 280° C., and comprises mixing the carbodiimide composition into the plastic by means of an extruder.

* * * * *